INVENTORS
Paul A. Jensen and
William C. Mann.
BY Sean Schron
ATTORNEY

United States Patent Office 3,451,042
Patented June 17, 1969

3,451,042
REDUNDANT SIGNAL TRANSMISSION SYSTEM

Paul A. Jensen, Baltimore, and William C. Mann, Laurel, Md., assignors to Westinghouse Electric Corporation, Pittsburgh, Pa., a corporation of Pennsylvania Filed Oct. 14, 1964, Ser. No. 403,809
Int. Cl. H04q *1/00;* H04l *25/02*
U.S. Cl. 340—147 10 Claims

ABSTRACT OF THE DISCLOSURE

A system including a plurality of main subsystems co-operating to provide an output signal. Each of the main subsystems has an identical standby which can replace the main subsystem in case of a failure. A single error detector at the output provides an error signal should the output signal deviate from normal. A switching circuit is responsive to any error signal provided to individually replace each main subsystem with its corresponding standby subsystem until the faulty subsystem has been replaced.

This invention, in general, relates to error free information transmission, and in particular to a system for automatically transferring to standby equipment upon the occurrence of an error in the main system.

Signal transmission systems such as analog systems, computer systems, communication and telemetry systems, require that a high order of reliability be maintained during operation particularly where repair would be extremely costly or impossible, such as on space vehicles.

To achieve high reliability, redundancy techniques are utilized to compensate for a lack of perfect reliability in the system. One type of redundancy requires the use of one or more duplicate systems of a main system so that upon the occurrence of an error, error detection means will cause the switching of operation from the main system to one of the duplicate systems. Not only does such a redundancy technique become costly, but the plurality of standby systems required to insure high reliability may occupy a greater amount of space than is available.

A higher degree of reliability is obtained in another type of standby redundancy system which involves a technique of dividing the main system into a plurality of subsystems and checking for errors at the output of each subsystem to switch in a standby subsystem should an error occur. Although the reliability of this type of system is higher than the duplicate system case it requires a somewhat more complex arrangement and in many instances it is not possible or convenient to check for errors at the output of every subsystem of the system.

It is therefore a primary object of the present invention to provide a highly reliable redundant signal transmission system.

Another object is to provide a redundant signal transmission system utilizing a plurality of subsystems with a signal error detector.

It is another object to provide a redundant signal transmission system which is of relatively simple construction.

Another object is to provide a redundant system utilizing simple low power logic circuitry.

Briefly, in accordance with the above objects, a main signal transmission system, or channel, is divided into a plurality of subsystems. One or more standby systems including standby subsystems each functionally identical to a corresponding main subsystem is provided. A single error detector at the output provides an error signal should the output signal deviate from normal. With an error signal present, a switching circuit causes individual ones of the main subsystems to be replaced by corresponding ones of the standby subsystems until the error producing subsystem has been replaced. Whereas in the prior art redundant systems an error is corrected in the time it takes to recognize the failure and switch in the standby unit, the present invention is contemplated for use in situations where some time delay may be tolerated.

The stated, and further objects and advantages of the present invention will become apparent upon a reading of the following detailed specification taken in conjunction with the drawings, in which.

Figure 1:
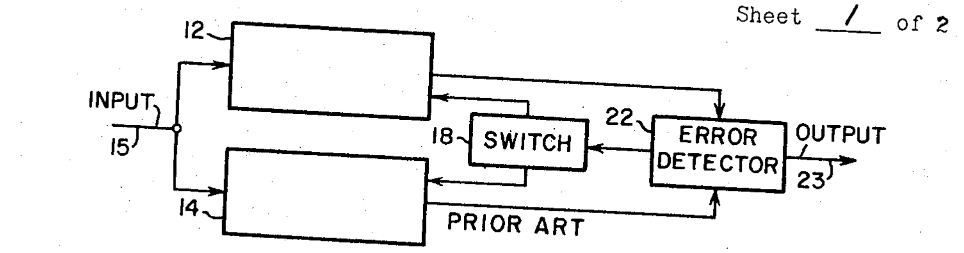
FIGURE 1 illustrates a system standby redundancy network of the prior art.

Referring now to FIG. 1, there is shown a standby redundancy system of the prior art which utilizes essentially parallel channels, or systems 12 and 14 each receiving the identical input signal on input lead 15. In operation, the switch 18 is operable to energize only one of the systems provided, for example system 12. The output of system 12 is fed to the error detector 22 and an output signal is provided on output lead 23. If the signal from system 12 deviates from normal, the error detector will cause the switch 18 to activate system 14 and deactivate system 12. In a typical system where long unattended operation is required, a plurality of systems and switches may be utilized. It is seen that a system producing an erroneous output will cause corrective action to switch that system into a deactivated state and to activate an entire new standby system. This corrective action may occur even though the error was produced by a very small component in the entire system and thus the operative other components of the system, although perfectly good, cease to perform any function.

Figure 2:
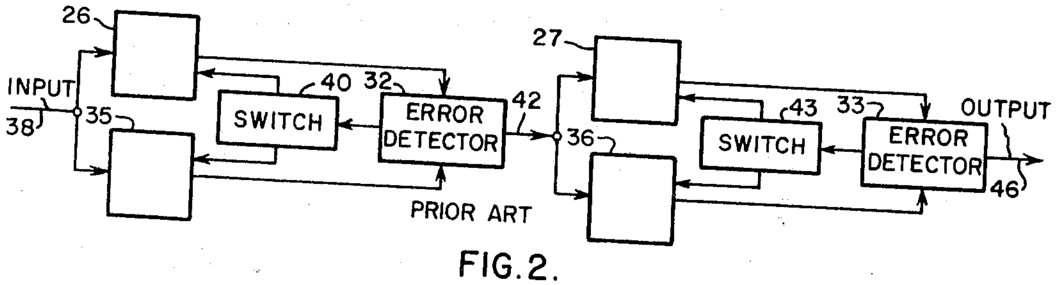
FIGURE 2 illustrates a subsystem standby redundancy network of the prior art.

A somewhat more reliable and space saving scheme is illustrated in FIG. 2 illustrating a prior art network which divides the system into a plurality of subsystems of which two are represented, and provides error detection and switching means after each subsection. The subsystems 26 and 27 of the first channel each provide an output signal to a respective error detector 32 and 33. A standby channel includes standby subsystems 35 and 36 each being operable, when functioning, to provide an output signal to these same error detectors. Assuming that in operation an input signal is provided to the main subsystem 26 and standby subsystem 35 on input lead 38 and switch 40 controls the activation of only one of the subsystems such as main subsystem 26. The output signal from main subsystem 26 fed through the error detector 32 is provided to a subsequent stage on lead 42 with the switch 43 controlling which one of the subsystems 27 or 36 is in an operable condition. An output signal is provided on output lead 46. If either of the error detectors 32 or 33 sense an abnormal condition in the signal received from the operative subsystem, it will cause a respective switch 40 or 43 to deactivate the operative subsystem and to activate the standby subsystem. This redundancy scheme provides relatively high reliability and fairly instantaneous repair and uninterrupted operation. In many situations a somewhat less instantaneous repair is tolerable and in many instances the scheme of FIG. 2 is not possible since the circuits provided may preclude insertion of error detector means after each subsystem, or stage.

Figure 3:
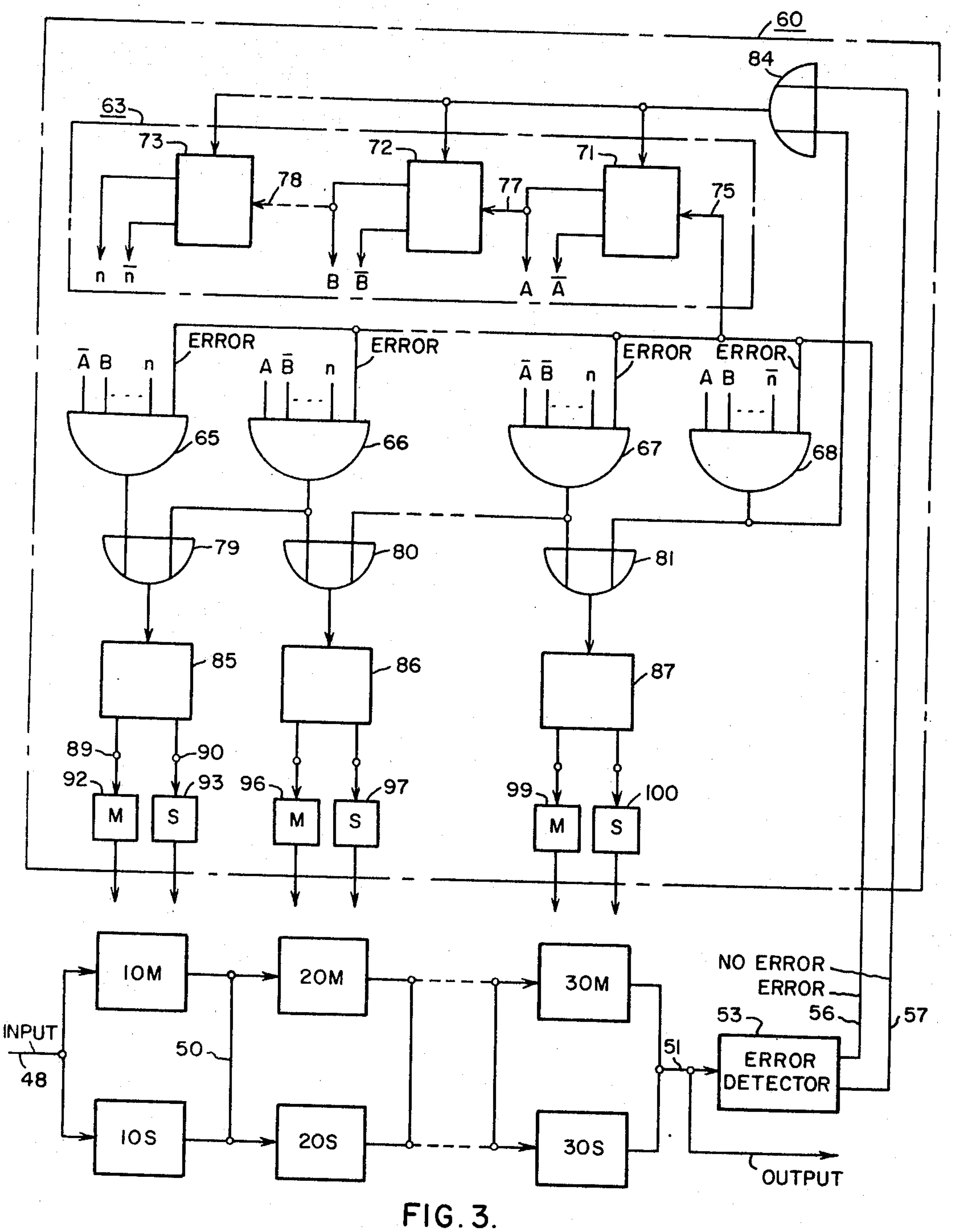
FIG. 3 illustrates an embodiment of the present invention.

In FIG. 3 there is shown an embodiment of the present invention illustrating a redundant network which is of relatively simple construction, requires relatively little power for operation, and is highly reliable.

The redundant signal transmission system of FIG. 3 includes a main system having a plurality of subsystems of which three, 10M, 20M and 30M are shown. A standby system includes a plurality of standby subsystems of which three, 10S, 20S and 30S are shown. An input signal received on input lead 48 will be acted upon by the operating one of either main subsystem 10M or standby subsystem 10S, the signals from which are passed to subsequent stages. A signal from the main subsystem 10M may be supplied to the following subsystem 20M or alternatively may be supplied to the standby subsystem 20S by line 50. Similarly, if the standby subsystem 10S is operative it may supply its signals to a following standby subsystem 20S or to main subsystem 20M via line 50 if that is the operating subsystem. This general scheme is continued until a last of the subsystems provides an output signal on output lead 51.

An error detector 53 is provided to initiate corrective action should an error occur in the output signal. The error detector 53 should be designed for the type of system utilized and may for example, initiate corrective measures when the output signal goes above or below precalculated voltage limits, or frequency limits, or power limits or simply deviates from a predetermined and known range or condition.

When an abnormal condition occurs corrective measures are initiated to sequentially replace individual ones of the main subsystems with corresponding individual ones of the standby subsystems until such time as the abnormal condition may be corrected. In the embodiment of the invention described herein this action will be performed by digital circuitry operable to perform logic operations in response to input signals representative of a binary 1 and binary 0, where a 1 might represent a positive voltage and a 0, a relatively less positive or ground voltage.

Since digital circuitry will be utilized, the error detector 53 is designed to provide digital output signals on lines 56 and 57 representing an error line and a no error line respectively. For normal operation a 0 signal will appear on error line 56 and a 1 signal will appear on the no error line 57. When an error occurs the no error line 57 will provide a 0 signal and a 1 signal will be provided, for a predetermined period of time depending upon the design of the system, on the error line 56.

The means designated 60 may be thought of as an electronic commutator which is responsive to an error signal from the error detector 53 to sequentially switch in standby subsystems to aid in eliminating the error-producing subsystem. The means 60 includes a counter 63 and a plurality of AND gates 65 through 68 each of which receives a unique combination of output signals from the counter 63 which will produce a different combination of output signals each time it is pulsed or sequenced, to selectively enable, and preferably in a sequential manner, only one of the AND gates 65 through 68, at any one time. The counter 63 includes a plurality of flip-flops 71, 72 and 73 which may be of the type that will switch states upon the occurrence of an input signal experiencing a transition from one binary state to the opposite binary state. By way of example, the flip-flop 71 will switch states when the input signal on line 75 switches from a 0 to a 1 and will not switch states when the input signal switches from a 1 to a 0. Flip-flops 72 and 73 may switch states upon a voltage transition of the same kind that is, flip-flops 72 and 73 will switch when the respective signals on lines 77 and 78 change from a 0 to a 1. The counter operation is initiated by receipt of a signal on the error line 56 from the error detector 53, which signals will also enable each of the AND gates 65 through 68.

With no error present a 1 signal will be provided on the no error line 57 to OR gate 84 the output of which is utilized to reset each of the flip-flops 71 through 73. With the flip-flops in the reset condition, 1 signals will be provided at output A, B . . . $n$ and 0 signals will be provided at output $\overline{A}$, $\overline{B}$ . . . $\overline{n}$. Since no error is present this unique combination of output signals need not initiate any corrective measures. When cycling through its operation a unique combination of output signals must be provided to a respective AND gate controlling a respective subsystem. In addition, as will be explained, a unique set of signals is required for an extra AND gate (AND gate 68 in FIG. 3). With these considerations, the counter would need $m$ flip-flops for $n$ number of subsystems such that $2^m > n+2$. Alternatively, a ring counter may be employed to provide sequential output signals.

The output signal from each of the AND gates 65 through 67 is fed to a respective OR gate 79 through 81 the output of which controls the operation of flip-flop members 85 through 87 of the same type as flip-flops 71 through 73.

Flip-flop 85 provides 1 and 0 signals at output terminals 89 and 90 and relay means 92 and 93 are responsive to these output signals for controlling which one of the main subsystem 10M or standby subsystem 10S will be placed into service. Very simply, a 1 signal appearing at output terminal 89 of flip-flop 85 will cause the main relay 92 to be activated while at the same time the 0 signal appearing at output terminal 90 ensures that the standby relay 93 keeps the standby subsystem 10S in a non-functioning or ready condition. When the AND gate 65 receives all 1 input signals to provide a 1 output signal the OR gate 79 will cause the flip-flop 85 to switch states of operation such that a 1 signal appearing at terminal 90 will cause the standby relay 93 to switch the standby subsystem 10S into the system in place of the main subsystem 10M. In a similar manner flip-flop 86 causes activation of either one or the other of main relay 96 or 97 which controls the placement into service of main subsystem 20M and standby subsystem 20S respectively. A last flip-flop 87 provides output signals to the main relay 99 and standby relay 100 for controlling subsystems 30M and 30S.

If the activation of the standby relay 93 by flip-flop 85, causing a replacement of the main subsystem 10M by the standby subsystem 10S, does not alleviate the error, then it is known that the main subsystem 10M is functioning properly. Since the main subsystem 10M is functioning properly it may be replaced into the system and to this end the output from a next succeeding AND gate 66 is fed to OR gate 79 so that when AND gate 66 is provided with all 1 input signals a 1 output signal causes flip-flop 85 to change states such that main relay 92 is activated to again place the main subsystem 10M back into the system. In a similar manner OR gate 80 receives the output signal from a next succeeding stage to switch the main subsystem 20M back into the system if it was not the error producing subsystem.

If one of the working subsystems fails and another subsystem fails intermittently such as might be caused by a temporary outside disturbance, the error detector 53 will continue to produce an error signal on the error line 56 since two failures at the same time although highly improbable, cannot be remedied. If such a situation occurs, the last flip-flop 87 will have replaced the main subsystem 30M by the standby subsystem 30S and an error signal, still present, will cause the counter 63 to sequence in a normal manner such that the last of the AND gates 68 receives all 1 input signals. The 1 output signal provided by the AND gate 68 is fed to OR gate 81 to trigger the flip-flop 87 causing a replacement of main subsystem 30M into the system and simultaneously causing OR gate 84 to provide an output signal to reset the flip-flops of the counter 63 so that procedure may be repeated until the intermittent disturbance disappears and proper corrective action taken.

Figure 4:
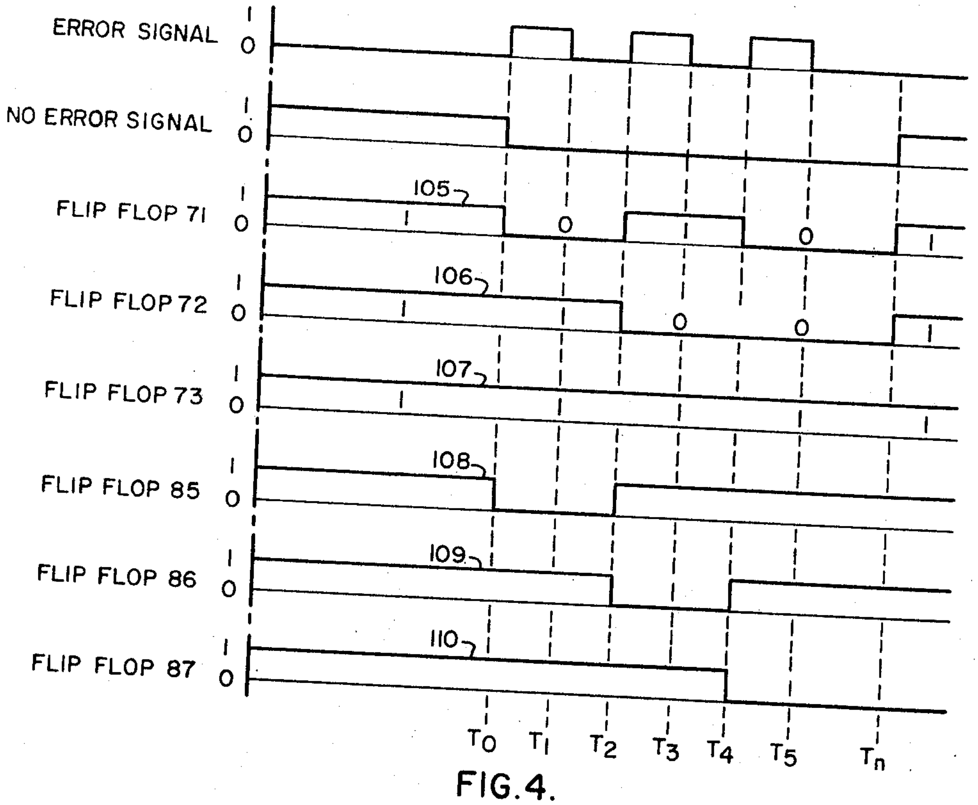
FIGURE 4 illustrates the voltage states of elements appearing in FIGURE 3.

In order to understand the operation of the present invention a situation will be considered wherein a system will comprise the three subsystems shown in FIG. 3 with subsystems 10M, 20M and 30M constituting the main subsystems initially put into operation. With reference to FIG. 4 illustrating the signal levels at various points in the circuit it is assumed that prior to the time $T_0$ no errors occur and the flip-flops 71 through 73 and 85 through 87 are in their reset conditions such that the A, B and *n* signals are 1's as are the signals controlling the main relays 92, 96 and 99. With three flip-flops utilized in the counter 63, the number 7, that is binary 111, is represented and none of the AND gates are receiving unique combinations of all 1 signals. Prior to time $T_0$ the signal on the error line 56 is a 0, while the signal on the no error line 57 is a 1. At time $T_0$ assume that an error occurs in the main subsystem 30M. The error detector 53 being responsive to the output signal on output lead 51 detects this abnormal condition and will cause the no error signal on line 57 to revert to a 0 and will provide error signal pulses on line 56. The pulse duration from $T_0$ to $T_1$ may be chosen in accordance with the parameters of the system. At time $T_1$ the error signal goes to 0 and will again provide an error signal pulse from time $T_2$ to time $T_3$. Although the error signal reverts to a 0 state at time $T_1$, the error detector 53 may be designed such that the no error signal will revert back to its 1 state only when the error signal remains 0 for a predetermined period of time for example equal to a time from $T_1$ to a time after $T_2$. Since the error signal has a voltage excursion from the 0 state to the 1 state, flip-flop 71 will switch states such that the A signal is a 0 and the $\overline{A}$ signal is a 1. This is shown in curve 105 at the time $T_0$. The switching from a 1 to a 0 is sensed by the flip-flop 72 which will remain in its previous condition since as before stated the flip-flop will only switch upon receipt of an input signal changing from a 0 to a 1 and not vice versa. The conditions of the flip-flops from time $T_0$ to $T_2$ are then as shown to be 110 representing the number 6. This unique combination of signals provided by the counter 63 is fed in various combinatorial forms to the AND gates 65 through 68 and it is seen that with the $\overline{A}$ signal a 1, the B signal a 1, and the *n* signal a 1, AND gate 65 and only AND gate 65 will provide an output signal since it is enabled by the error signal on line 56. The output signals provided by AND gate 65 causes flip-flop 85 to switch to its opposite state as shown in curve 108 to thereby energize the standby relay 93 causing a replacement of the main subsystem 10M with the standby subsystem 10S. Since the main subsystem 10M is not the one in error, a replacement thereof will not eliminate an error signal which again is provided at time $T_2$. A second pulse to flip-flop 71 changes the state thereof in addition to switching states of flip-flop 72 as shown by curve 106. The state of the flip-flops at this point represents the number 5, binary 101, with the A signal a 1, the B signal a 0 and the *n* signal a 1. This combination of signals applied to AND gate 66 along with the enabling error signal causes a 1 output signal from the gate which switches states of the previous flip-flop 85 through OR gate 79 as shown in curve 108 at time $T_2$ to thereby switch the main subsystem 10M back into operation. The output signal from AND gate 66 additionally causes flip-flop 86 to switch states as shown by curve 109 to thereby energize the standby relay 97 to switch the standby subsystem 20S into operation. Since the main subsystem 20M was not in error, the error signal will persist and at time $T_4$ will again cause flip-flop 71 to switch from a 1 to a 0 state with the output signals provided being 100 a binary representation of the number 4. This unique combination of signals in conjunction with the error signals causes AND gate 67 to provide an output signal to cause previous flip-flop 86 to change states of operation thereby switching main subsystem 20M back into operation as illustrated by curve 109 at time $T_4$. AND gate 67 additionally causes flip-flop 87 to change states as shown by curve 110 thereby activating standby relay 100 to switch the standby subsystem 30S into operation. A replacement of the main subsystem 30M by the standby subsystem 30S eliminates the error such that the error signal on line 56 remains in its 0 state. After a predetermined period of time, for example at time $T_n$, the no error signal will be provided on line 57 causing OR gate 84 to provide an output signal to reset all of the flip-flops 71 through 73 of counter 63 such that the A, B and *n* signals are all 1's. Since flip-flop 87 was not caused to be switched back to its initial condition after energizing the standby relay 100, the signal transmission system will continue to provide output signals with main subsystems 10M and 20M and standby subsystem 30S as the operative subsystems. If a subsequent error occurs, the aforedescribed procedure repeats itself until the error is corrected.

If a temporary disturbance should cause a malfunctioning of two or more operating subsystems the individual replacement in the described manner would not eliminate an error signal. In order to allow the network 60 to again sequence through its sequential replacement operation there is provided AND gate 68 which is also responsive to a unique combination of output signals provided by the flip-flops of counter 63 such that when a last of a standby subsystem has replaced the last main subsystem the persistent error signal causes the counter to provide output signals to enable the AND gate 68, the output signal of which not only switches states of flip-flop 87 but is fed to OR gate 84 to reset flip-flops 71 through 73 of the counter 63 so that the aforedescribed corrective measures may again be instituted.

In the present invention an error occurring in the first main subsystem will be corrected in a relatively short time since it merely involves a replacement of the faulty subsystem with its corresponding standby system. If, however, the fault occurs in a last of the subsystems a somewhat longer time delay is experienced since each of the previous subsystems must be put through the replacement operation. Since only one error detector is needed in the present invention a relatively simple scheme is provided for situations where instantaneous repair is not required. The logic circuitry employed need not be designed for the fastest possible operating speed and consequently the various gates and flip-flops can be designed requiring little power, the design leading itself to micro-miniaturization. In this respect it is to be noted that the curves of FIG. 4 have been somewhat idealized in that no time delays have been shown. However, even with the propagation time delays involved the basic voltage states appearing are similar to that shown in FIG. 4.

The main system and the standby system shown in FIG. 3 is seen to receive an input signal on input lead 48. This signal may originate from some sort of a transducer or transducers such as in a telemetry system wherein the output signal appearing on output lead 51 would be transmitted to a receiver stage. FIG. 3 may alternately represent the receiver means with the input signal on input lead 48 therefor representing a received telemetry signal. Alternatively, the first subsystem may be the originator of signals in which case the input lead 48 would not be utilized.

Accordingly, there has been provided a redundant signal transmission system which includes a plurality of subsystems for each system. A plurality of standby subsystems are provided to take over the function of a main subsystem should a failure occur. Only one error detector is utilized for providing an error signal to initiate corrective action in a manner such that each of the main subsystems is individually and sequentially replaced by a standby subsystem and then placed back into operation if the error persists. Obviously, many modifications may be made in view of the teachings herein. For example, although one corresponding standby subsystem is shown for each main susbystem, it is obvious that a plurality of corresponding function standby subsystems may be utilized. Various types of error detectors including a human operator may be utilized to sequence the main and standby subsystems through the aforedescribed procedure. Where even slower speeds may be tolerated, the means 60 may include in place of digital circuitry, mechanical commutator or stepping means to sequence the various subsystems. The invention described herein is applicable to various types of circuitry and the term signal transmission system is meant to include any interconnection of both single or multiple input circuits which may have single or multiple outputs.

Although one embodiment of the present invention has been particularly described, and other embodiments mentioned, it is to be understood that various other modifications and changes may be made without departing from the spirit and scope of the invention.

We claim as our invention:

1. A redundant signal transmission system comprising:
a plurality of main subsystems each providing a signal to a subsequent subsystem the last of which provides an output signal;
a plurality of standby subsystems;
means responsive to an abnormal condition of only one of said signals to sequentially replace individual ones of said main subsystems with individual ones of said standby subsystems.

2. A redundant signal transmission system comprising:
a plurality of main subsystems arranged to provide an output signal;
a plurality of standby subsystems;
a single error detector responsive to said output signal for providing an error signal should said output signal deviate from normal;
means responsive to said error signal for replacing individual ones of said main subsystems with individual ones of said standby subsystems until the error producing subsystem has been replaced.

3. A redundant signal transmission system comprising:
a plurality of main subsystems arranged to provide an output signal;
a plurality of standby subsystems each for performing an identical function as a corresponding main subsystem;
a single error detector for providing an error signal in response to an error in said output signal;
commutator means responsive to said error signal for substituting a first of said standby subsystems for a corresponding identical function main subsystem and operable thereafter to individually substitute subsequent standby subsystems for main subsystems to aid in the elimination of said error.

4. A redundant signal transmission system comprising:
a plurality of normally operating main subsystems operable to provide an output signal;
a plurality of standby subsystems each for performing a corresponding function as a main subsystem;
counter means;
means for sequencing said counter means in response to an error in one of said normally operating subsystems;
means responsive to the state of said counter means for substituting a first standby subsystem for a first main subsystem and back again should said error persist and for similarly substituting subsequent standby subsystems for corresponding subsequent main subsystems for correction of said error.

5. A redundant signal transmission system comprising:
a plurality of normally operating main subsystems operable to provide an output signal;
a plurality of standby subsystems each for performing a corresponding function as a main subsystem;
counter means;
means for sequencing said counter means in response to an error in one of said normally operating subsystems;

means responsive to the state of said counter means for substituting a first standby subsystem for a first main subsystem and back again should said error persist and for similarly substituting subsequent standby subsystems for corresponding subsequent main subsystems for correction of said error;
means for resetting said counter means and reinitiating said sequencing should said error persist after a last of said standby subsystems has been substituted for a last of said main subsystems.

6. A redundant signal transmission system comprising:
a plurality of main subsystems operable to provide an output signal;
a plurality of standby subsystems;
a single error detector means responsive to said output signal for providing an error signal upon the occurrence of an abnormal output signal and a no error signal when said output signal is within predetermined normal ranges;
resettable sequencer means responsive to said error signal for sequentially replacing said main subsystem with said standby subsystems to eliminate the subsystem causing said abnormal output signal.

7. A redundant signal transmission system comprising:
a plurality of main subsystems operable to provide an output signal;
a plurality of standby subsystems;
a single error detector means responsive to said output signal for providing an error signal upon the occurrence of an abnormal output signal and a no error signal when said output signal is within predetermined normal ranges;
resettable sequencer means responsive to said error signal for sequentially replacing said main subsystems with said standby subsystems;
said resettable sequencer means being responsive thereafter to said no error signal to terminate its sequential replacement action, and to reset to an initial condition.

8. A redundant signal transmission system comprising:
a plurality of main subsystems jointly operable to provide an output signal;
a plurality of standby subsystems each capable of performing the same function as a corresponding main subsystem;
gating means for each main and corresponding standby subsystem operable to place a selected one of said subsystems into operation;
means responsive to an abnormal output signal for activating said gating means to sequentially switch corresponding function subsystems into operation.

9. A redundant signal transmission system comprising:
a plurality of main subsystems jointly operable to provide an output signal;
a plurality of standby subsystems each capable of performing the same function as a corresponding main subsystem;
gating means for each main and corresponding standby subsystem operable to place a selected one of said subsystems into operation; and
means for providing sequential patterns of enabling signals in response to an error in said output signal;
each said gating means being responsive to a unique one of said patterns of enabling signals to activate a previously unactuated subsystem to eliminate the error producing subsystem.

10. A transmission system according to claim 9 wherein the gating means switches a previously deactivated subsystem into operation and thereafter switches the previously operating subsystem back into operation should said error persist.

References Cited

UNITED STATES PATENTS

| | | | |
|---|---|---|---|
| 3,235,842 | 2/1966 | Roth et al. | 340—147 |
| 2,229,108 | 1/1941 | Maggio et al. | |

FOREIGN PATENTS

| | | |
|---|---|---|
| 954,226 | 4/1964 | Great Britain. |

OTHER REFERENCES

K. L. Hall, "Basic Rules for Designing," Electronics, Apr. 12, 1963, pp. 62–66, vol. 36, No. 15.

JOHN W. CALDWELL, *Primary Examiner.*

D. J. YUSKO, *Assistant Examiner.*

U.S. Cl. X.R.

178—69